United States Patent
Süß et al.

(10) Patent No.: US 11,680,825 B2
(45) Date of Patent: Jun. 20, 2023

(54) ROTARY ENCODER

(71) Applicant: SICK STEGMANN GmbH, Donaueschingen (DE)

(72) Inventors: Sebastian Süß, Donaueschingen (DE); David Hopp, Donaueschingen (DE)

(73) Assignee: SICK AG, Waldkirch (DE)

(*) Notice: Subject to any disclaimer, the term of this patent is extended or adjusted under 35 U.S.C. 154(b) by 281 days.

(21) Appl. No.: 17/124,983

(22) Filed: Dec. 17, 2020

(65) Prior Publication Data

US 2021/0190177 A1 Jun. 24, 2021

(51) Int. Cl.
*G01D 5/14* (2006.01)

(52) U.S. Cl.
CPC ......... *G01D 5/145* (2013.01); *G01D 2205/28* (2021.05)

(58) Field of Classification Search
CPC . G01D 5/145; G01D 2205/28; G01D 2205/26
See application file for complete search history.

(56) References Cited

U.S. PATENT DOCUMENTS

| | | | | |
|---|---|---|---|---|
| 4,716,290 A | * | 12/1987 | Ogawa | G01D 5/04 74/435 |
| 8,154,427 B2 | * | 4/2012 | Mayer | G01D 5/145 341/2 |
| 2004/0256545 A1 | * | 12/2004 | Stobbe | G01D 5/145 250/231.13 |
| 2018/0292233 A1 | * | 10/2018 | Vandersteegen | G01B 7/30 |

FOREIGN PATENT DOCUMENTS

| | | |
|---|---|---|
| DE | 3442345 A1 | 6/1985 |
| DE | 102008033236 A1 | 1/2009 |
| DE | 102009029431 A1 | 3/2011 |
| DE | 102017130000 A1 * | 6/2019 |
| DE | 102017130000 A1 | 6/2019 |
| EP | 2295938 A2 | 3/2011 |
| EP | 3385678 A1 | 10/2018 |

OTHER PUBLICATIONS

Office Action dated Nov. 11, 2020 issued in corresponding application DE 102019135185.5.

* cited by examiner

*Primary Examiner* — Alvaro E Fortich
*Assistant Examiner* — Dilara Sultana
(74) *Attorney, Agent, or Firm* — Nath, Goldberg & Meyer; Jerald L. Meyer

(57) ABSTRACT

A rotary encoder (1) is provided, including a shaft (W) connected to and drivable by an external shaft, a first gear unit (G1) and a second gear unit (G2), each following rotations of the shaft (W). Both gear units (G1, G2) (G1 and G2) are drivable independently of one another by the shaft (W), a first gear stage (G1S1) of the first gear unit (G1) has a first detection unit (E1), and a gear stage (G2S2) downstream of a first gear stage (G2S1) of the second gear unit (G2) has a second detection unit (E2). An evaluation unit derives the angular position from signals of the detection units (E1, E2) and compares the rotations of the first gear stage (G1S1) and the downstream gear stage (G2S2) for plausibility, taking into account a known ratio of the rotation of the first gear stage (G1S1) to the rotation of the downstream gear stage (G2S2).

11 Claims, 1 Drawing Sheet

ROTARY ENCODER

Figure 1:
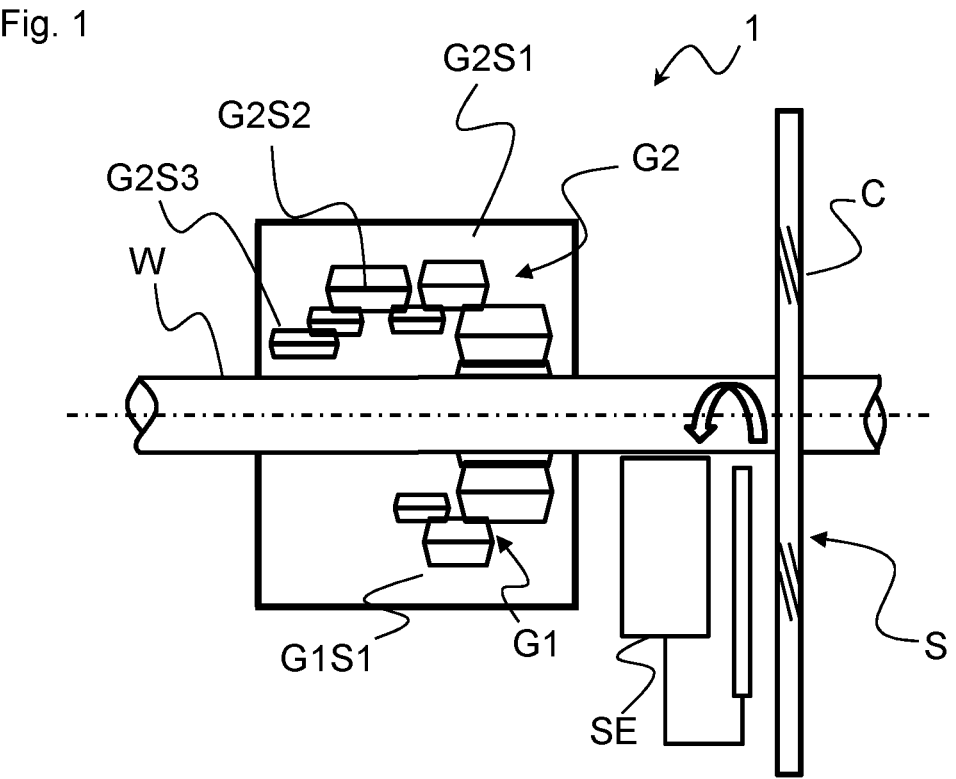

The invention relates to a rotary encoder for determining an angular position of a shaft according comprising first and second gear unit, which each reproduce rotations of the shaft, wherein both gear units can be driven independently of each other by the shaft, wherein a first gear stage of the first gear unit has a first detection unit, and a gear stage downstream of a first gear stage of the second gear unit has a second detection unit, and an evaluation unit for deriving the angular position from signals of the detection units.

In many industrial applications, a rotary encoder is used as a position measuring device to determine a mechanical angular position of a shaft, for example. The rotary encoder can be based on an optical, capacitive, inductive or magnetic measuring principle. The determination of the angular position can be incremental or absolute and such a rotary encoder, measuring the angle in the 360° range, is called a single-turn rotary encoder, or simply single-turn.

As an extension to the functionality of the rotary encoder, besides determining the angular position over one rotation of the shaft, the number of rotations can be recorded and stored mechanically or electrically so that when the rotary encoder is switched on, the number of rotations can be read out unambiguously, especially after a power-off period, during which the shaft can be rotated manually, for example. A rotary encoder having such a determination of the number of completed rotations implemented is called multi-turn rotary encoder, or simply multi-turn.

In a gear-based multi-turn rotary encoder, a rotary motion of the rotary encoder shaft is tapped via mechanical gearing to drive a serial gear transmission cascade of gear wheels, with the gears providing a stepwise transmission. The angular position of individual gear wheels in this transmission cascade can now be determined analogous to the determination of the angular position in a single-turn. In this way, the number of rotations of the shaft can be read out when the device is switched on.

A common implementation of a gear-based multi-turn rotary encoder, for example, consists of three cascaded gear stages with one detection unit per gear stage, whereby the detection unit detects the rotation of the respective gear stage, which means that up to 4096 rotations can be counted, for example.

In order to fulfill a requirement of a safety standard with regard to a safe multi-turn rotary encoder, for example in terms of the so-called Functional Safety SIL2 or SIL3, a single multi-turn gear unit is not sufficient, since, for example, damage to mechanical parts, a lack of individual components of the gear unit or malfunctions caused by mechanical tolerances can lead to an incorrect count of the number of rotations. In particular, a shaft output, i.e. a transmission of the rotations of the shaft to the gear unit, and the first gear stages of a transmission cascade are susceptible to mechanical failure or faults, because higher speeds and greater mechanical tolerances are present at the shaft output and the first gear stage than at the relatively slow rotating downstream gear stages.

It is an objective of the invention to provide a rotary encoder for determining an angular position of a shaft, which ensures a reliable determination of the angular position of the shaft.

The objective is solved according to the invention by a rotary encoder with the features of claim 1.

In other words, the rotary encoder for determining an angular position of a shaft comprises the shaft connected to and drivable by an external shaft, a first gear unit and a second gear unit, each of which reproduces rotations of the shaft, both gear units being drivable independently of each other by the shaft, a first gear stage of the first gear unit having a first detection unit, and a gear stage downstream of a first gear stage of the second gear unit having a second detection unit, and an evaluation unit for deriving the angular position from signals from the detection units, and wherein the evaluation unit compares the rotations of the first gear stage of the first gear unit and the downstream gear stage of the second gear unit for plausibility, taking into account a known ratio of the rotation of the first gear stage of the first gear unit to the rotation of the downstream gear stage of the second gear unit, wherein the ratio is greater than 2 to 1.

This has the advantage that, in case of a mechanical error between the shaft and the first and second gear units or an error in the first or second gear unit itself, an inconsistency between the counted rotations of the two gear units is detectable, so that the error can be concluded.

According to a preferred embodiment, the first gear stage of the second gear unit has no detection unit. This reduces the cost of components used in the rotary encoder. In particular, an existing rotary encoder can be converted according to the inventive subject matter by omitting the detection unit and further development of the evaluation unit.

According to another preferred embodiment, each detection unit comprises a magnet and a Hall sensor. This makes it easy to provide selected gear stages with a detection unit or to omit the detection unit for a selected gear stage.

Furthermore, according to another preferred embodiment, the first and second gear units each comprise several cascaded gear stages, so that several gear stages can be provided for each gear unit. In particular, the two first gear stages each form a first gear stage of the respective cascade of the first or second gear unit and are arranged directly on the shaft, with the downstream gear stage forming a second gear stage of the second gear unit.

Herein, the cascading can be designed in such a way that preferably the first two gear stages are arranged at any position, especially at a distance from the shaft, in the respective cascade of the first and second gear unit. Preferably, in both cascades of the first and second gear unit, only the gear unit of the second gear unit determined as the first gear unit has no detection unit.

According to another preferred embodiment, the first gear unit forms a single-stage gear unit, whose single gear stage is equipped with the first detection unit. In contrast, the second gear unit comprises at least two gear stages, whereby the first gear stage of the second gear unit is not assigned a detection unit and the second gear stage of the second gear unit forms the downstream gear stage and is provided with the second detection unit. This has the advantage that the first gear unit can be designed very simple so that components and the associated costs can be saved.

Advantageously, the evaluation unit checks whether the angular position of the downstream gear stage of the second gear unit changes according to the known ratio of the rotations when comparing to the angular position of the first gear stage of the first gear unit, or whether the angular position of the downstream gear stage of the second gear unit changes does not change in the correct relation to the angular position of the first gear stage of the first gear unit. In other words, with the knowledge of the ratio of the rotation of the downstream gear stage of the second gear unit to the rotation of the first gear stage of the first gear unit, i.e. in which relative angular position the first gear stage of the first gear unit must be in relation to the downstream gear stage of the second gear unit, the angular position of the downstream gear stage is determined in relation to the angular position of the first gear stage of the other cascading, so that a comparison can reveal a possible error of the rotary encoder.

This has the advantage that it is possible to check a mechanical fault, for example, at the point of the gear unit with the largest output.

This means that if the angular position of the downstream gear stage of the second gear unit changes to the angular position of the first gear stage of the first gear unit exactly according to the ratio of the rotation of the first gear stage of the first gear unit to the rotation of the downstream gear stage of the second gear unit, then a faultless operation of the rotary encoder is determined. If, however, the angular positions of the downstream gear stage of the second gear unit and the first gear stage of the first gear unit change without any ratio, in particular completely independently of each other, then an error in the rotary encoder can be determined. In other words, the change of the angular position of the downstream gear stage of the second gear unit and the first gear stage of the first gear unit reflects the known ratio of the rotations.

According to another preferred embodiment, each gear stage itself consists of cascaded gear wheels, with each gear stage being separated from the downstream gear stage by means of an output gear wheel which, for the respective gear stage, delivers a specified output speed to the downstream gear stage. This reduces the number of rotations of the downstream gear stage compared to the number of the preceding gear stage so that a higher accuracy of the counting of rotations can be achieved.

Advantageously, the output gear wheel of the first gear stage of the first gear unit and the output gear wheel of the downstream gear stage of the second gear unit are equipped with the first and second detection unit respectively. In this case, the output gear wheel of the first gear stage of the second gear unit does not have a detection unit.

The invented rotary encoder can be designed in a similar way by adding further features, while showing similar advantages. Such further features are exemplary, but not conclusively described in the dependent claims following the independent claim.

The invention is also explained below with regard to further advantages and features with reference to the attached drawing by means of embodiments. In the drawing the figures show in:

FIG. 1 a schematic representation of a basic structure of a rotary encoder, and

Figure 2:
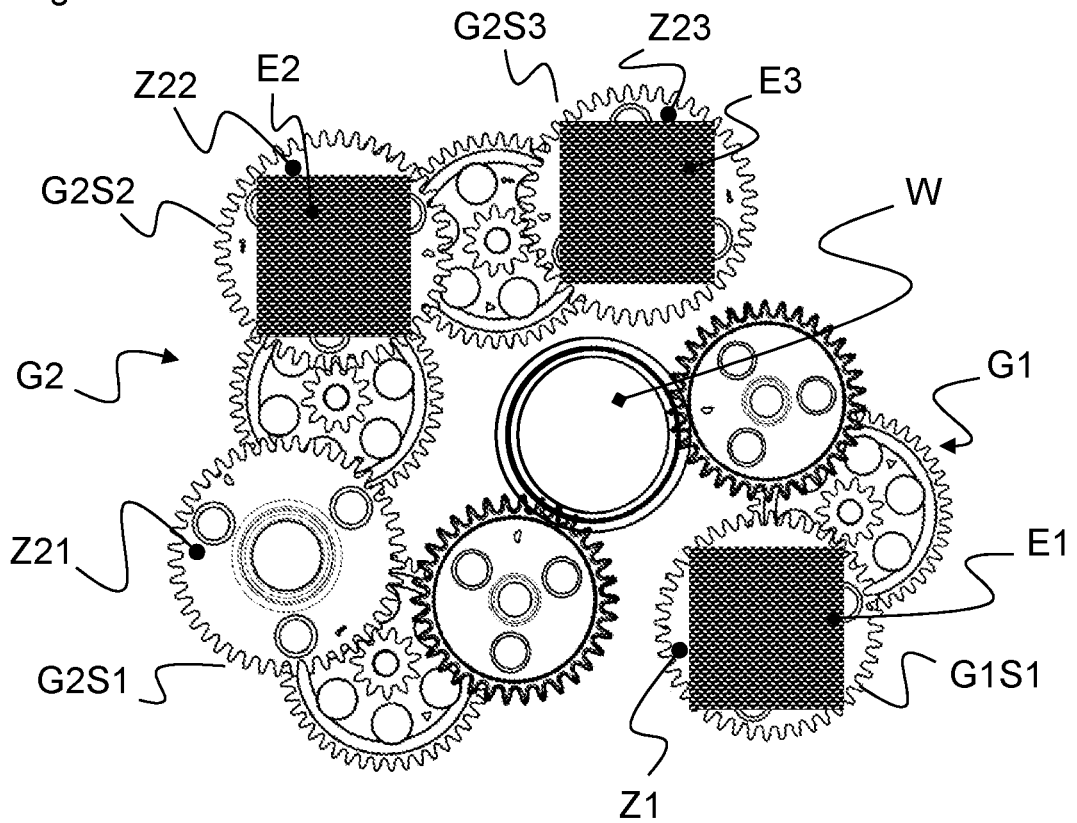

FIG. 2 a schematic detailed representation of a preferred embodiment of a rotary encoder according to the invention.

FIG. 1 shows a schematic representation of an embodiment of a basic construction of a rotary encoder 1, which detects rotations of a shaft W and determines an angular position of the shaft W in order to control the rotations of an external shaft of an electric machine, for example. For this purpose the rotary encoder 1 comprises the shaft W, which in turn is connected to and driven by the external shaft not shown.

In particular, a single-turn unit S is provided on the shaft W, which outputs the angular position of the shaft W within one rotation of the shaft W. The single-turn unit S has a coding unit C mounted on the shaft W and a single-turn detection unit SE, so that the coding unit C modulates each angular change of the shaft W within one rotation and the single-turn detection unit SE detects this modulated angular change and outputs it as angular position signals.

Rotary encoder 1 comprises a first gear unit G1 and a second gear unit G2, each of which represents rotations of the shaft W. For this purpose, the first and second gear units G1 and G2 are connected to the shaft W preferably by means of a gear wheel (no reference sign in FIG. 1) of the shaft W, so that both gear units G1 and G2 are driven independently by the shaft W, advantageously but not necessarily with an identical drive transmission ratio.

The two gear units G1 and G2 each have a first gear stage G1S1 and G2S1. At this point, it should be mentioned that the designation "first" does not refer to an explicit indication of the location of the gear stages G1S1 and G2S1 within a sequence of gear stages G1S1; G2S1, G2S2, G2S3 of the first or second gear unit G1 or G2, respectively, but rather it is a simplified designation of the gear stages G1S1 and G2S1 to which the description of the invention further refers in the following.

In this illustrated embodiment, the second gear unit G2 comprises two further gear stages G2S2 and G2S3, whereby the second gear stage G2S2 of the second gear unit G2 is arranged downstream of the first gear stage G2S1 and is referred to in the following as "downstream gear stage G2S2 of the second gear unit G2".

In other words, and as shown in FIG. 1, the second gear unit G2 comprises several cascaded gear stages G2S1, G2S2 and G2S3, the first gear unit G1 preferably having only one gear stage as first gear stage G1S1.

Here, the two first gear stages G1S1 and G2S1 each form preferably a first gear stage of the respective cascade of the first and second gear unit G1 and G2 and are arranged in direct contact to the shaft W, with the downstream gear stage G2S2 forming a second gear stage of the second gear unit G2. This makes it possible to carry out an error check of the rotary encoder 1 directly at a point of the rotary encoder 1 with the highest possible mechanical load for the rotary encoder 1.

Apart from the embodiment shown, both the first gear unit G1 and the second gear unit G2 can advantageously comprise several cascaded gear stages G1S1, G2S1, G2S2 and G2S2 each, so that a higher accuracy of the detection of the shaft rotation W would be possible. In this case, the first two gear stages G1S1 and G2S1 are arranged at any position, in particular at a distance from the shaft W, in the respective cascade of the first and second gear units G1 and G2, so that the error check could be carried out at a position of the rotary encoder 1 with less mechanical load on the gear units G1 and G2, which would, for example, result in an increased reliability of the error check itself.

FIG. 2 shows a schematic detailed representation of a preferred embodiment of a rotary encoder 1 according to the invention, in which in particular the first gear unit G1 forms a single-stage gear unit whose sole gear stage G1S1 is provided with the first detection unit E1. The second gear unit G2, which is driven independently of the first gear unit G1, comprises at least two gear stages G2S1, G2S2 and G2S3, three of which are shown in FIG. 2, wherein no detection unit is assigned to the first gear stage G2S1 of the second gear unit G2 and the downstream second gear stage G2S2 of the second gear unit G2 is provided with the second detection unit E2. The third gear stage G2S3 of the second gear unit G2 also has a third detection unit E3.

In accordance with the invention, a ratio of the rotation of the first gear stage G1S1 of the first gear unit G1 to the rotation of the downstream second gear stage G2S2 of the second gear unit G2 is stored in an evaluation unit (not shown) for deriving the angular position of the shaft W from the signals of the detection units E1 to E3, the ratio being greater than 2 to 1.

This means that it is stored in the evaluation unit that, for example, if the first gear stage G1S1 of the first gear unit G1 has rotated by two turns, the downstream gear stage G2S2 of the second gear unit G2 must have rotated by one turn. With a ratio of 4 to 1, this means that if the first gear stage G1S1 of the first gear unit G1 has rotated one turn or eight turns, the downstream gear stage G2S2 of the second gear unit G2 must have rotated one quarter of a turn or two turns.

Taking into account the known relationship between the rotations of the first gear stage G1S1 of the first gear unit G1 and the downstream gear stage G2S2 of the second gear unit G2 to each other, the evaluation unit compares the rotations of the first gear stage G1S1 of the first gear unit G1 and the downstream gear stage G2S2 of the second gear unit G2 for plausibility and derives the angular position of the shaft W.

This enables the evaluation unit to determine a consistency or inconsistency between the detected rotations of the first gear stage G1S1 of the first gear unit G1 and the downstream gear stage G2S2 of the second gear unit G2 in order to derive from this a fault-free operation or a fault of the rotary encoder 1.

In particular, the evaluation unit checks whether the angular position of the downstream gear stage G2S2 of the second gear unit G2 changes according to the known ratio of the rotations to the angular position of the first gear stage G1S1 of the first gear unit G1, since the relative angular position of the first gear stage G1S1 of the first gear unit G1 to the downstream gear stage G2S2 of the second gear unit G2 is determined by the ratio. Furthermore, the evaluation unit checks whether the angular position of the downstream gear stage G2S2 of the second gear unit G2 does not change in any ratio to, in particular completely independently of, an angular position change of the first gear stage G1S1 of the first gear unit G1.

If the known ratio is represented by the angular position change of the downstream gear stage G2S2 of the second gear unit G2 to the first gear stage G1S1 of the first gear unit G1, so that the angular position change of the gear stages G1S1; G2S1, G2S2 and G2S3 of the two gear units G1 and G2 is plausible with respect to each other, then a fault-free operation of the rotary encoder 1 is determined by the evaluation unit.

If, however, the angular position change of the downstream gear stage G2S2 of the second gear unit G2 takes place, for example, completely independently of the angular position change of the first gear stage G1S1 of the first gear unit G1, so that the angular position change in itself does not appear plausible, then the evaluation unit of the rotary encoder 1 of the invention can detect an error in the transmission of the rotations of the shaft W via the first and second gear units G1 and G2 to the detection units E1 to E3, which would detect a malfunction of the rotary encoder 1.

Since the check is performed via two independent gear units G1 and G2, an increased functional safety of the rotary encoder 1 is given, since a fault in one of the gear units G1 or G2 leads to a discrepancy between the angular changes of the first and second gear units G1 and G2.

As shown in FIG. 2, in particular, each gear stage G1S1; G2S1, G2S2 and G2S3 itself consists of cascaded gear wheels, the gear stages G1S1; G2S1, G2S2 and G2S3 of the first and second gear unit G1 and G2 respectively being separated from the respective downstream gear stage G2S2 and G2S3 by means of an output gear wheel Z1; Z21, Z22 and Z23. The output gear wheels Z1; Z21, Z22, and Z23 for the respective gear stage G1S1; G2S1, G2S2, and G2S3 transmit an intended output speed to the respective downstream gear stage G2S2 and G2S3.

According to the embodiment shown, the output gear wheel Z1 of the first gear stage G1S1 of the first gear unit G1 is equipped with the first detection unit E1 and the output gear wheel Z22 and Z23 of the downstream gear stage G2S2 and the third gear stage G2S3 of the second gear unit G2 are equipped with the second and third detection units E2 and E3 respectively. The output gear wheel Z21 of the first gear stage G2S1 of the second gear unit G2 has no detection unit. This provides the increased functional safety of the rotary encoder 1, despite savings in components such as gear stages or detection units.

REFERENCE CHARACTER LIST

1 Rotary encoder
C Coding unit
E1, E2, E3 Detection unit
G1 and G2 First and second gear unit
G1S1 First gear stage of the first gear unit
G2S1 First gear stage of the second gear unit
G2S2 Downstream gear stage of the second gear unit
G2S3 Gear stage of the second gear unit
S Single-turn unit
SE Single-turn detection unit
W Shaft
Z1, Z21, Z22, Z23 Output gear wheel

The invention claimed is:

1. A rotary encoder (1) for determining an angular position of a shaft (W), comprising:
    the shaft (W), which is connected to an external shaft and can be driven by the external shaft;
    a first gear unit (G1) and a second gear unit (G2) which each follow rotations of the shaft (W), wherein the first and second gear units (G1, G2) are driven independently of each other by the shaft (W);
    wherein a first gear stage (G1S1) of the first gear unit (G1) has a first detection unit (E1), and a second gear stage (G2S2) of the second gear unit (G2), which is downstream of a first gear stage (G2S1) of the second gear unit (G2), has a second detection unit (E2); and
    an evaluation unit for deriving the angular position from signals of the first and second detection units (E1, E2), wherein the evaluation unit compares the rotations of the first gear stage (G1S1) of the first gear unit (G1) and the second gear stage (G2S2) of the second gear unit (G2) for plausibility, taking into account a known ratio of the rotation of the first gear stage (G1S1) of the first gear unit (G1) to the rotation of the second gear stage (G2S2) of the second gear unit (G2), wherein the ratio is greater than 2 to 1.

2. The rotary encoder (1) according to claim 1, wherein the first gear stage (G2S1) of the second gear unit (G2) has no detection unit.

3. The rotary encoder (1) according to claim 1, wherein each of the first and second detection units (E1, E2) comprises a magnet and a Hall sensor.

4. The rotary encoder (1) according to claim 1, wherein the first and second gear units (G1 and G2) each comprise a plurality of cascaded gear stages (G1S1, G2S1, G2S2, G2S3).

5. The rotary encoder (1) according to claim 4, wherein the first gear stages (G1S1, G2S1) each form a first gear stage of the respective cascade of the first and second gear units (G1 and G2) and are arranged directly on the shaft (W).

6. The rotary encoder (1) according to claim 4, wherein the first gear stages (G1S1, G2S1) are arranged at any desired position, in particular at a distance from the shaft (W), in the cascading of the first and second gear units (G1, G2).

7. The rotary encoder (1) according to claim 6, wherein in both cascading of the first and second gear units (G1, G2) only the gear stage (G2S1) of the second gear unit (G2), which is determined as the first gear stage, has no detection unit.

8. The rotary encoder (1) according to claim 2, wherein the first gear unit (G1) forms a single-stage gear unit whose single gear stage (G1S1) is provided with the first detection unit (E1), and the second gear unit (G2) forms at least two gear stages (G2S1, G2S2, G2S3), wherein no detection unit is assigned to the first gear stage (G2S1) of the second gear unit (G2) and the second gear stage of the second gear unit (G2) is provided with the second detection unit (E2).

9. The rotary encoder (1) according to claim 1, wherein the evaluation unit checks whether the angular position of the second gear stage (G2S2) of the second gear unit (G2) changes according to the known ratio of the rotations to the angular position of the first gear stage (G1S1) of the first gear unit (G1), or whether the angular position of the second gear stage (G2S2) of the second gear unit (G2) does not change in any proportion to, in particular completely independently of, an angular position change of the first gear stage (G1S1) of the first gear unit (G1).

10. The rotary encoder (1) according to claim 1, wherein each of the gear stages (G1S1, G2S1, G2S2, G2S3) itself consists of cascaded gear wheels and is separated from a downstream one of the gear stages means of an output gear wheel (Z1, Z21, Z22, Z23), which for the respective gear stage delivers a specified output speed to the downstream one of the gear stages (G2S2, G2S3).

11. The rotary encoder (1) according to claim 10, wherein the output gear wheel (Z1) of the first gear stage (G1S1) of the first gear unit (G1) and the output gear wheel (Z22) of the second gear stage (G2S2) of the second gear unit (G2) are equipped with the first and second detection units (E1, E2), respectively, and the output gear wheel (Z21) of the first gear stage (G2S1) of the second gear unit (G2) has no detection unit.

* * * * *